United States Patent [19]

Kirschner et al.

[11] Patent Number: 4,731,749

[45] Date of Patent: Mar. 15, 1988

[54] ELECTRONIC POSTAGE METER HAVING MULTIPLE NON-VOLATILE MEMORIES FOR STORING DIFFERENT HISTORICAL INFORMATION REFLECTING POSTAGE TRANSACTIONS

[75] Inventors: Wallace Kirschner, Trumbull, Conn.; Easwaran C. N. Nambudiri, East Meadow, N.Y.; Douglas H. Patterson, Norwalk, Conn.

[73] Assignee: Pitney Bowes Inc., Stamford, Conn.

[21] Appl. No.: 643,113

[22] Filed: Aug. 22, 1984

[51] Int. Cl.[4] .............................................. G06F 13/00

[52] U.S. Cl. .................................................... 364/900

[58] Field of Search ... 364/200 MS File, 900 MS File; 235/61.9 A, 153 AK

[56] References Cited

U.S. PATENT DOCUMENTS

| | | | |
|---|---|---|---|
| 3,937,938 | 2/1976 | Matthews | 235/153 AK |
| 4,335,434 | 6/1982 | Baumann et al. | 364/464 |
| 4,420,819 | 12/1983 | Price et al. | 364/900 |
| 4,564,922 | 1/1986 | Muller | 364/900 |

*Primary Examiner*—Archie E. Williams, Jr.
*Assistant Examiner*—Michael J. Ure
*Attorney, Agent, or Firm*—Michael J. DeSha; David E. Pitchenik; Melvin J. Scolnick

[57] ABSTRACT

An electronic postage meter includes two non-volatile memories. One of the non-volatile memories is utilized for storing in historical sequence in respective registers the transaction information for each of a predetermined number of transactions which have occurred prior to the last transaction. This memory is accessed at the time of each transaction. The real-time transaction information may be sequentially written over the earliest information in the registers. The other non-volatile memory stores cumulative data upon power-down.

9 Claims, 3 Drawing Figures

ELECTRONIC POSTAGE METER HAVING MULTIPLE NON-VOLATILE MEMORIES FOR STORING DIFFERENT HISTORICAL INFORMATION REFLECTING POSTAGE TRANSACTIONS

BACKGROUND

The present invention relates to electronic postage meters, and more specifically to an electronic postage meter having multiple non-volatile memories(NVMs) for storing different historical information reflecting postage transactions.

Various electronic postage meter systems have been developed, as for example, the systems disclosed in U.S. Pat. No. 3,078,457 for Microcomputerized Electronic Postage Meter Systems, U.S. Pat. No. 3,938,095 for Computer Responsive Postage Meter, European Patent Application No. 80400603.9, filed May 5, 1980, for Electronic Postage Meter Having Improved Security and Fault Tolerance Features, U.S. Pat. No. 4,301,507, for Electronic Postage Meter Having Plural Computing Systems, and copending application Ser. No. 447,815, filed Dec. 8, 1982, for Stand-Alone Electronic Mailing Machine.

Generally, electronic postage meters include some form of non-volatile memory capability to store critical postage accounting information. This information includes, for example, the amount of postage remaining in the meter for subsequent printing and the total amount of postage already printed by the meter. Other types of accounting or operating data may also be stored in the non-volatile memory, as desired.

However, conditions can occur in electronic postage meters where information stored in non-volatile memory may be lost. A total line power failure or fluctuation in voltage conditions can cause the microprocessor associated with the meter to operate erratically and either cause erasure of data or the writing of spurious data in the non-volatile memory. The erasure of data or the writing of spurious data in the non-volatile memory may result in a loss of critical accounting information. Since the accounting data changes with the printing of postage and is not permanently stored elsewhere, there is no way to recapture or reconstruct the lost accounting information. Under such circumstances, it is possible that a user may suffer a loss of postage funds.

To minimize the likelihood of a loss of information stored in the non-volatile memory, various approaches have been adopted to insure the high reliability of electronic postage meters. It is known from aforementioned U.S. Pat. No. 3,978,457 and aforementioned co-pending application Ser. No. 447,815 to provide a microprocessor controlled electronic postage meter having memory architecture which includes a temporary storage memory for storing accounting data reflecting each meter transaction and a non-volatile memory to which the accounting data is transferred during the power down cycle of the meter.

Another approach for preserving the stored accounting data has been the use of redundant non-volatile memories. One such redundant memory system is disclosed in patent application Ser. No. 343,877, filed Jan. 29, 1982, in the name of Frank T. Check, Jr., and entitled Electronic Postage Meter Having Redundant Memory. With such redundant memory system the two redundant non-volatile memories are interconnected with a microprocessor by way of completely separated data and address lines to eliminate error conditions. The data stored in each memory is the same, although the data may be stored in a diffcrent form in each memory, e.g., it may be coded. The data is applied to the memories simultaneously or sequentially at different times during the postage transactions.

Another redundant memory system is disclosed in the aforementioned European Patent Application No. 80400603.9. In such patent application, the same accounting data is written into each of the two non-volatile memories, designated BAMs, by updating the specific registers of the BAMs twice during each postage meter transaction, once in temporary form and once in permanent form to minimize the loss of accounting data during microprocessor failure.

The aforementioned redundant memory systems store the same accounting data in both non-volatile memories and do not store "permanent" historical information of the postage transactions or provide a sequence of individually addressable memory locations to provide a historical record or audit trail for each postage transaction.

SUMMARY OF THE INVENTION

It is an object of the present invention to provide multiple non-volatile memories in an electronic postage meter for storing different historical information reflecting postage transactions.

It is an object of the present invention to provide a non-volatile memory capable of storing accounting data for each postage transaction "permanently" in individually addressable memory locations.

It is a further object of the present invention to provide a complete historical file for each trip cycle or postage transaction of a postage meter.

It is a still further object of the present invention to provide a non-volatile memory for sequentially storing accounting data for a predetermined number of postage transactions.

It is a still further object of the present invention to provide a non-volatile memory capable of providing a continuous historical record of a predetermined number of previous postage transactions as measured backward in time from the last postage transaction.

Briefly, in accordance with the present invention, a method and associated apparatus is provided for storing different historical information reflecting the postage transactions of an electronic postage meter, comprising the steps of and associated apparatus for providing a first non-volatile memory, providing a second non-volatile memory having a larger data storage capacity than the first non-volatile memory with individually addressable memory locations for storing information regarding each postage meter transaction on a real time basis, writing cumulative historical information corresponding to the postage meter transactions into the first non-volatile memory during each power down cycle of the meter, sequentially writing historical information corresponding to each postage meter transaction in a different memory location in the second nonvolatile memory in real time as each postage meter transaction occurs to provide a historical record of each postage transaction so that two different records of historical information regarding the postage transactions are provided in non-volatile memory with the first non-volatile memory providing a cumulative historical record reflecting the postage transactions prior to a power down cycle and the second non-volatile memory providing a sequential historical record of each individual postage transaction. Advantageously, the last individually addressable memory location of the second non-volatile memory is interconnected to the first individually addressable memory location of the second non-volatile memory for sequentially reusing the individual addressable memory locations to write accounting data therein to provide a continuous historical record of a predetermined number of previous postage transactions as measured backward in time from the last postage transaction.

Other objects, aspects and advantages of the present invention will be apparent from the detailed description considered in conjunction with the drawings, as follows:

DETAILED DESCRIPTION

Figure 1:
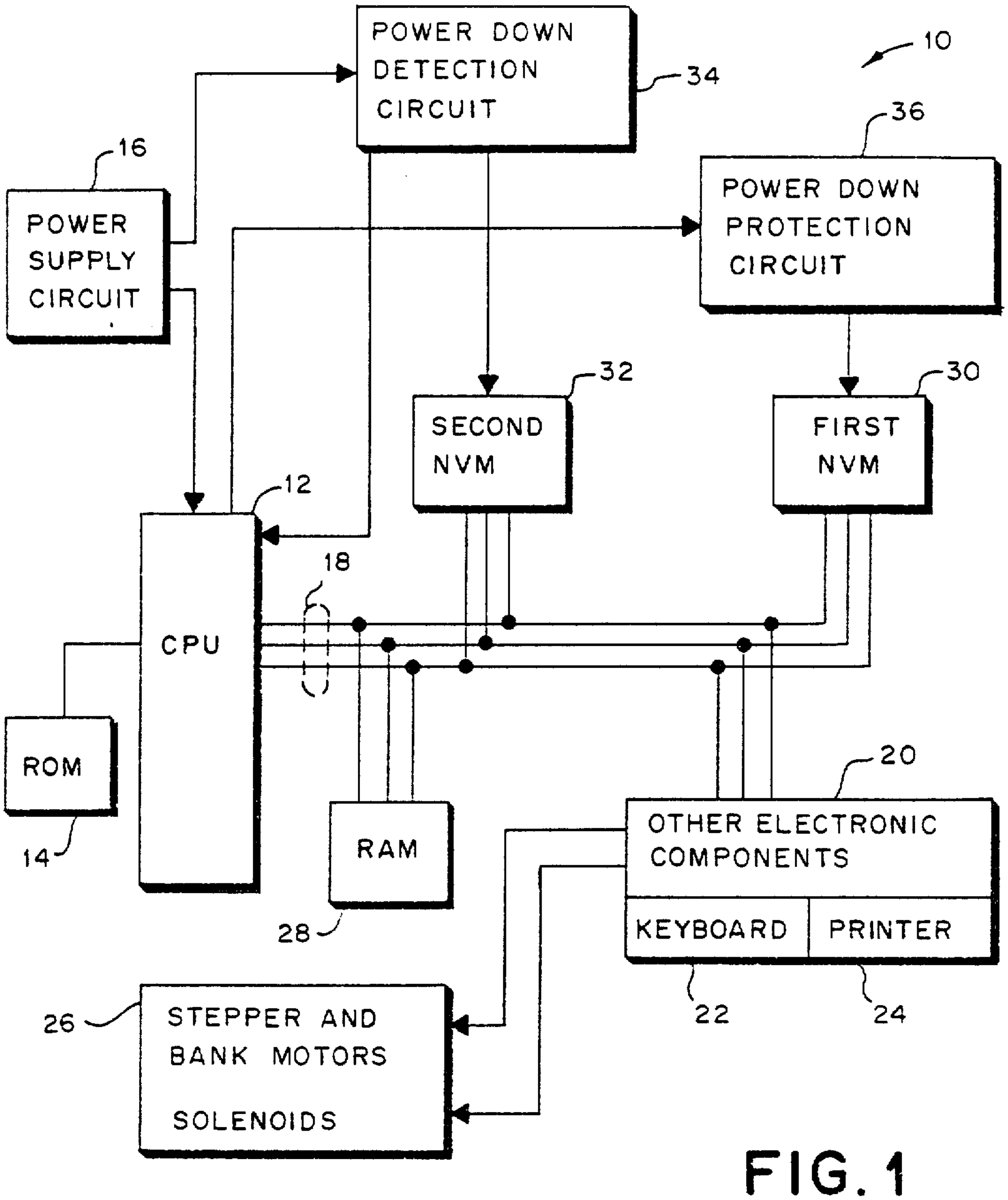
FIG. 1 is a block diagram of the general outline of an electronic postage meter incorporating multiple non-volatile memories for storing different historical information reflecting postage transactions in accordance with the present invention.

Referring to FIG. 1, an electronic postage meter with multiple non-volatile memories for storing different historical information reflecting postage transactions in accordance with the present invention is generally illustrated at 10. Preferably, the general architecture of the electronic postage meter is similar to that disclosed in the aforementioned co-pending patent application Ser. No. 447,815, modified as disclosed in FIG. 1 to incorporate a real time NVM, as shown in more detail in co-pending application Ser. No. 643,219 filed on even data herewith and entitled, Non-Volatile Memory System with Real Time and Power Down Data Storage Capability For An Electronic Postage Meter, now abandoned. Specifically, a central processing unit 12, in the form of a microprocessor, e.g., a Model 8085A microprocessor, is operated under program control in accordance with the programs stored in a ROM 14. The microprocessor 12 is energized by the output of a power supply circuit 16 during a power up cycle to place the meter in an operative condition. During operation of the postage meter, the microprocessor 12 transmits and receives signals over a data bus 18 coupled to the various meter components.

Generally, the microprocessor 12 transmits signals to and receives signals from the other electronic components 20, the keyboard 22 and the printer 24 for the actuation of stepper and bank motors and solenoids 26 to accomplish the printing of postage on a document. Each such postage imprinting operation or printing transaction is referred to as a trip cycle.

During each trip cycle, a certain amount of postage is used. A volatile random access memory 28, such as model 8155 with the appropriate input and output and timing circuits, contains an ascending register (AR) a descending register (DR) and an appropriate cyclic redundancy codes (CRCs) and control sums. During each trip cycle, and under control of the microprocessor 12, the descending register is decremented the appropriate amount for the postage used during the trip and the ascending register is incremented the appropriate amount for the postage used during the trip. Thus, the AR provides a running or current total of the amount of postage that has been used through completion of the last trip cycle and the DR provides a running or current total of the amount of postage remainin the meter for subsequent use.

A first NVM 30, such as an ER 3400 MNOS integrated circuit chip, is also electrically coupled to the data bus 18. Under control of the microprocessor 12, accounting data which is temporarily stored in the RAM 28 during each meter transaction is transferred from the RAM 28 and written into the first NVM 30 upon commencement of a power down cycle. For example, 15 different data addresses or blocks are provided in the first NVM 30 for writing cumulative accounting data sequentially in a different block during each power down cycle to maximize the endurance of the memory.

During normal operation of thepostage meter, the first NVM 30 is held in a non-write condition by the output signals from the microprocessor 12 over data bus 18. However, during a power failure (power down cycle), the microprocessor 12 initiates a power down cycle routine in which the accounting data which has been tmporarily stored in the volatile RAM 28 is transferred or written into one of the data blocks of the first NVM 30.

Also coupled to the data bus 18 to receive accounting data from the microprocessor 12 is a second NVM 32. Preferably, the NVM 32 is a SEEQ 5516A electrically erasable read only memory (EEROM) having an endurance of 1 million write cycles. However, it should be understood that other NVMs which have high endurances may also be utilized, such as battery backed CMOS integrated circuit chip or other similar integrated circuit chips. Under control of the microprocessor 12 the accounting data for each postage transaction, e.g., postage used, and other accounting data desired, such as AR and DR, is written into the NVM 32. Accounting data, such as AR and DR, as well as piece count and batch count data is also temporarily stored in RAM 28.

Figure 2:
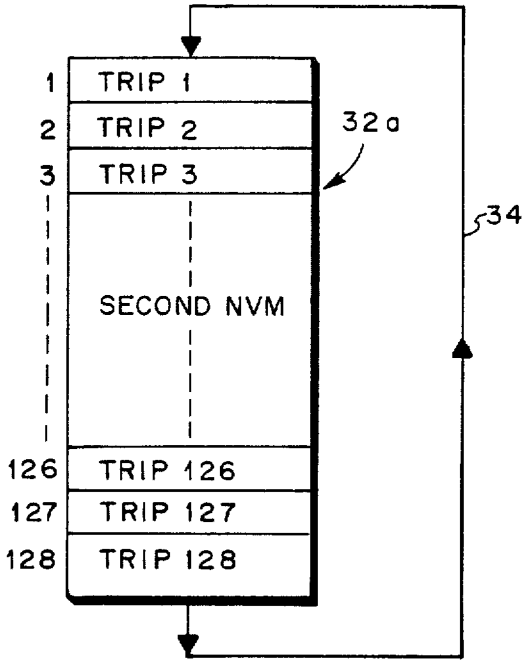
FIG. 2 is a schematic diagram of a continuous data loop non-volatile memory for sequentially storing accounting data for each postage transaction.

Referring to FIG. 2, the second NVM 32 of FIG. 1 is shown in enlarged form in FIG. 2 as 32A. The NVM 32A is illustrated with a plurality of individually addressable memory locations, designated as 1 through 128 in FIG. 2, for sequentially storing accounting data of each postage transaction or trip cycle. Further, the accounting data for the first trip cycle of the meter is stored in memory location 1 and designated Trip 1 and the accounting data for the second trip cycle is stored in memory location 2 and designated Trip 2. This storage ofaccounting data continues sequentially through the memory locations, the last of which is designated here as Trip 128. Various accounting data including the postage used during that trip or the cyclic redundancy code for each trip, as well as AR and DR may be stored at each address 1-128, as desired. Further, the second NVM 32A as illustrated in FIG. 2 includes 128 individually addressable memory locations, thereby allowing it to store a maximum of 128 postage transactions or trip cycles prior to a power down cycle. Advantageously, if a single NVM 32A is used having a memory capacity or number of individually addressable memory locations which are less in number than the number of trip cycles or postage transactions which the meter has actually undergone, the last memory location address, here 128, is electrically connected to the first memory location or address 1 through line 34 to provide a continuous data loop so that subsequent trips, i.e., 129, 130 etc. are sequentially written into memory addresses 1, 2 etc., thereby enabling the memory addresses 1-128 to be sequentially re-used to provide a continuous "permanent" record or historical file of the last 128 trip cycles or postage transactions of the meter. It should be understood that a NVM having a smaller or greater number of individually addressable memory locations may be employed as desired.

Figure 3:
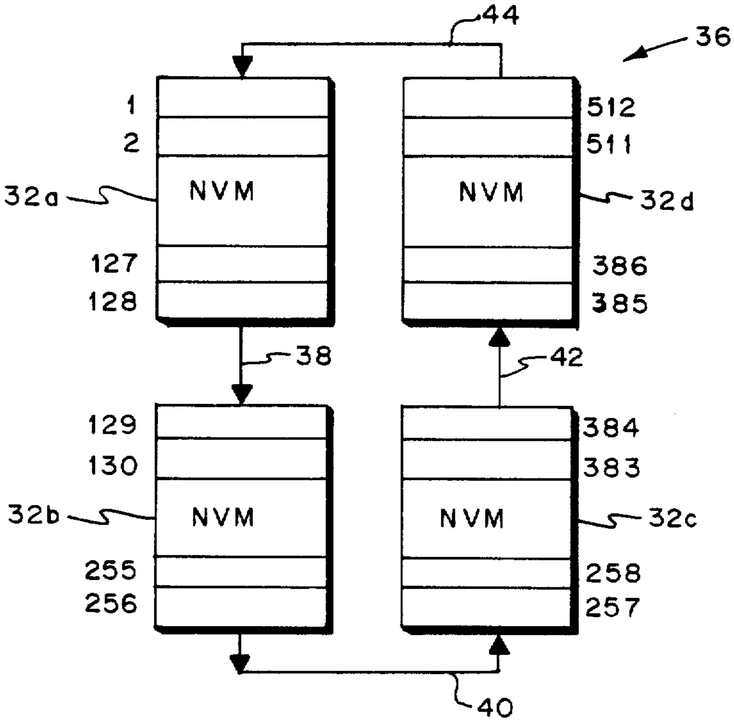
FIG. 3 is a block diagram showing a plurality of cascaded real time continuous data loop non-volatile memories for sequentially storing accounting data for each postage transaction.

Referring to FIG. 3, an expanded data storage capacity real time NVM 36 is illustrated including a plurality of NVMs chips, here four, designated 32A-32D. The NVMs 32A-32D are connected in cascade to provide a predetermined number of separately addressable memory locations, designated 1-512, to store 512 individual transactions or trip cycles. To implement this cascade arrangement of NVMs 32A-32D, the last memory address 128 of NVM 32A is electrically connected to the first memory address 129 of the NVM 32B through line 38, the last memory address 256 of NVM 32B is electrically connected to the first memory address 257 of the NVM 32C through line 40, the last memory address 384 of NVM 32C is electrically connected to the first memory address 385 of the NVM 32D through line 42, and the last memory address 512 of the NVM 32D is electrically connected to the first memory address 1 of the NVM 32A through line 44. With such an arrangement, a continuous data loop is also completed between the NVM chips 32A-32D to provide a "permanent" record or historical file of the last 512 trips or postage transactions. Advantageously, in the event of meter failure, such a historical information file provides a complete audit trail of a predetermined number of the most recent postage transactions in accordance with the memory capacity of the NVM 32 or expanded NVM 36.

In operation, and referring generally to FIG. 1, the microprocessor 12 under program control of the programs stored in ROM 14 transfers accounting data for each trip cycle or postage transaction of the meter to the RAM 28 to update the AR and DR to the current value as well as storing information as to batch count and piece count. During a power down cycle of the meter, the current cumulative accounting data is transferred from the RAM 28 and written into one of the memory blocks of the first NVM 30 to provide a permanent current record of the accounting information.

Accounting data for each trip cycle is also written into the separately addressable memory locations of the second NVM 32 in realtime on-the-fly to provide a permanent record of each trip cycle with a maximum capacity for storing trip cycles corresponding to the number of separately addressable memory locations. In FIG. 2, the NVM 32A is illustrated as having 128 separately addressable memory locations for storing accounting data for 128 trip cycles. Advantageously, the last memory location 128 of the NVM 32A is electrically connected in a continuous data loop to the first memory location 1 so that writing into the NVM 32A willcontinue sequentially to store information of the last 128 trip cycles. The 128 memory locations can be continuously used for the writing of data therein limited only by the endurance of the NVM 32A. With a SEEQ 5516A EEROM used for NVM 32A, the endurance is 1 million write cycles.

The operation of expanded NVM 36 illustrated in FIG. 3 is similar to the operation of the NVM 32A of FIG. 2 except that a plurality of NVMs 32A-32D are connected in cascade to provide an expanded memory capability, shown as 512 separately addressable memory locations. Writing can continue indefinitely around the continuous data loop of the expanded NVM 36, limited only by the endurance of the NVMs 32A-32D, with 512 trip cycles being the maximum number of trip cycles capable of being stored in the NVM 36 at any time.

From the foregoing description, it should be apparent that a "permanent" historical record of the accounting data for each one of a predetermined number of trip cycles is stored on-the-fly in real time to provide a first complete historical accounting data file or audit trail and that current cumulative accounting data is also "permanently" stored during the power down cycle of the meter to provide a second historical accounting data file which contains different historical accounting data than the first historical accounting data file.

It should be understood for the purpose of the present application that the term postage meter refers to the general class of devices for the imprinting of a defined unit value for governmental or private carrier delivery of parcels, envelopes or other like applications for unit value printing. Thus, although the term postage meter is utilized, it is both known and employed in the trade as a general term for devices utilized in conjunction with services other than those exclusively employed by governmental postage and tax services. For example private, parcel and freight services purchase and employ such meters as a means to provide unit value printing and accounting for individual parcels.

Further, it will be apparent to those skilled in the art that various modifications may be made in the present invention without departing from the spirit and scope thereof as described in the specification and defined in the appended claims.

What is claimed is:

1. A method for storing different historical information reflecting the postage transactions of an electronic postage meter, comprising the steps of:

providing a first non-volatile memory;

providing a second non-volatile memory having a larger data storage capacity than the first non-volatile memory with individually addressable memory locations for storing information regarding each postage meter transaction on a real time basis;

writing cumulative historical information corresponding to the postage meter transactions into the first non-volatile memory during each power down cycle of the meter;

sequentially writing historical information corresponding to postage meter transactions in respective different memory locations in the second non-volatile memory in real time as each postage meter transaction occurs to provide a historical record of each postage transaction so that two different records of historical information regarding the postage transactions are provided in non-volatile memory with the first non-volatile memory providing a cumulative historical record reflecting the postage transactions prior to a power down cycle and the second non-volatile memory providing a sequential historical record of each individual postage transaction.

2. The method recited in claim 1, including the steps of:

sequentially re-using said individually addressable memory locations to write accounting data therein to provide a continuous historical record of a predetermined number of previous postage transactions as measured backward in time from the last postage transaction.

3. The method recited in claim 1, including the steps of:

transferring accounting data from a volatile memory to the first non-volatile memory under control of a microprocessor during the power down cycle of the meter;

transmitting accounting data reflecting each postage meter transaction to the second non-volatile memory under control of the microprocessor.

4. The method recited in claim 1, wherein:

the second non-volatile memory includes a plurality of non-volatile memory chips;

electrically coupling the plurality of non-volatile chips to provide a sufficient number of individually addressable memory locations to store information regarding a predetermined number of postage transactions.

5. In an electronic postage meter, a system for storing different historical information reflecting the postage transactions , comprising:

first non-volatile memory means;

second non-volatile memory means having a larger data storage capacity than said first non-volatile memory means with individually addressable memory locations for storing information regarding each postage meter transaction on a real time basis;

microprocessor means for writing cumulative historical information corresponding to the postage meter transactions into said first non-volatile memory means during each power down cycle of the meter and sequentially writing historical information corresponding to each postage meter transaction in respectively different memory locations in said second non-volatile memory means in real time as each postage meter transaction occurs to provide a historical record of each postage transaction so that two different records of historical information regarding the postage transactions are provided in non-volatile memory with said first non-volatile memory means providing a cumulative historical record reflecting the postage transactions prior to a power down cycle and said second non-volatile memory means providing a historical record of each individual postage transaction.

6. The system recited in claim 5, wherein after the historical information corresponding to a postage meter transaction is written into the last individually addressable memory location of said second non-volatile memory means the address accessed for the next writing of information is the first individually addressable memory location of said second non-volatile memory means to provide a continuous data loop for sequentially re-using said individually addressable memory locations to write accounting data therein to provide a continuous historical record of a predetermined number of previous postage transactions as measured backward in time from the last postage transaction.

7. The system recited in claim 5, including:

a volatile memory means;

said microprocessor means storing accounting data in said volatile memory means reflecting the postage transactions of the meter and transferring the stored accounting data to said first non-volatile memory means during a power down cycle.

8. The system recited in claim 5, wherein:

said second non-volatile memory means includes a plurality of non-volatile memory chips electrically connected in series to provide a sufficient number of individually addressable memory locations to store information regarding a predetermined number of postage transactions.

9. The system recited in claim 8, including:

means for interconnecting the last individually addressable memory location of said last non-volatile memory means to the first individually addressable memory location of said first non-volatile memory means to provide a continuous data loop for sequentially re-using said individually addressable memory locations to write accounting data therein to provide a continuous historical record of a predetermined number of previous postage transactions as measured backward in time from the last postage transaction.

* * * * *